(12) United States Patent
Hendrix et al.

(10) Patent No.: US 7,394,232 B2
(45) Date of Patent: Jul. 1, 2008

(54) INTERLEAVED SWITCHING CONVERTERS IN RING CONFIGURATION

(75) Inventors: Machiel Antonius Martinus Hendrix, Eindhoven (NL); Roelf Van Der Wal, Eindhoven (NL); Jacobus Josephus Leijssen, Eindhoven (NL); Josephus Adrianus Maria Van Erp, Eindhoven (NL)

(73) Assignee: Koninkljke Philips Electronics N.V., Eindhoven (NL)

( * ) Notice: Subject to any disclaimer, the term of this patent is extended or adjusted under 35 U.S.C. 154(b) by 42 days.

(21) Appl. No.: 10/563,923

(22) PCT Filed: Jul. 1, 2004

(86) PCT No.: PCT/IB2004/051095

§ 371 (c)(1),
(2), (4) Date: Jan. 9, 2006

(87) PCT Pub. No.: WO2005/006526

PCT Pub. Date: Jan. 20, 2005

(65) Prior Publication Data

US 2007/0103132 A1      May 10, 2007

(30) Foreign Application Priority Data

Jul. 10, 2003  (EP) ................... 03102076

(51) Int. Cl.
   *G05F 1/00*   (2006.01)
(52) U.S. Cl. ............... 323/272; 363/65; 363/71; 363/72
(58) Field of Classification Search .......... 363/65, 363/71, 72
   See application file for complete search history.

(56) References Cited

U.S. PATENT DOCUMENTS

| | | | |
|---|---|---|---|
| 5,477,132 A * | 12/1995 | Canter et al. ........... | 323/282 |
| 5,875,104 A * | 2/1999 | Prager ................... | 363/65 |
| 5,929,618 A | 7/1999 | Boylan et al. | |
| 6,157,182 A * | 12/2000 | Tanaka et al. ........... | 323/284 |
| 6,292,378 B1 * | 9/2001 | Brooks et al. ........... | 363/65 |

* cited by examiner

*Primary Examiner*—Jessica Han
*Assistant Examiner*—Emily Pham

(57) ABSTRACT

A switched mode power supply assembly that has a plurality of power supply modules cyclically coupled to each other. Each power supply module has a synchronization control module for generating a synchronization control signal for a next neighboring module and for receiving a synchronization control signal from a previous neighboring module to ensure interleaved operation of all modules.

22 Claims, 8 Drawing Sheets

INTERLEAVED SWITCHING CONVERTERS IN RING CONFIGURATION

The present invention relates in general to a switched mode power supply. Particularly, the present invention relates to a DC/DC converter stage or a DC/AC inverter stage, receiving a substantially constant input voltage or current and generating a DC or AC output voltage or current. In the following explanation of the present invention, it will be assumed that the converter receives a constant input voltage and generates an output current, but this is merely by way of example and not intended to restrict the present invention.

BACKGROUND OF THE INVENTION

Switched mode power supplies of the above-described type are generally known, and they are commercially available for several applications. In one example, the switched mode power supply is implemented as a boost converter, for converting the output voltage of a solar cell array (in the order of 100 V) to a higher constant DC level in the order of about 420 V, i.e. higher than the maximum voltage of the standard mains voltage. With such converter, it is possible to transfer energy from solar cells to the mains.

In another example, the switched mode power supply is implemented as a DC/AC inverter, for generating an AC current from a DC voltage. Such inverter can be used in, for instance, a lamp driver, having an input for connection to AC mains, and having a driver output for driving a discharge lamp. Such drivers typically comprise a stage where a substantially constant voltage is generated from the alternating input voltage, followed by a stage where an alternating current is generated on the basis of said constant voltage. In yet another example, the switched mode power supply is implemented as a transconductance amplifier for driving an actuator in a motion control apparatus.

Generally speaking, switched mode power supplies have been developed for a specific output power. Generally speaking, for a higher output power, the size of the components used in the power supply must be larger. This can be avoided by using a power supply assembly comprising two or more power supply units connected in parallel. In that case, each individual power supply unit only needs to provide a relatively low power so that the size of the individual components can be relatively small, which implies a reduction of costs. Also, an advantage would be that use could be made of low-power supply units which have already been developed and which have already proven themselves, without the need of developing a complete new high-power converter. Further, it is an advantage that low-power supply units can easily be manufactured, and that high-volume production facilities already exist.

A further advantage of using multiple power supply units connected in parallel is to be recognized in the fact that it is possible to generate an output current with a low ripple amplitude. FIG. 1 illustrates a time graph of a typical power supply output current I, which successively rises (line 101) and falls (line 102) between an upper level $I_H$ (line 103) and a lower level $I_L$ (line 104). On a sufficiently large time scale, such current can be considered as being a constant current having a magnitude $I_{AV}=0.5 \cdot (I_H+I_L)$, and having a ripple amplitude $0.5 \cdot (I_H-I_L)$. In principle, it would be possible to have each power supply unit of a power supply assembly operate completely independently from all the other power supply units. Then, however, it is to be expected that the ripple amplitude of the overall output current of the power supply assembly is the summation of the individual output ripple amplitudes of the individual power supply units. A general aim is to have the ripple as small as possible. Therefore, it is preferred that the power supply units operate in synchronization, such that their output peaks are distributed evenly in time. FIG. 2 is a graph illustrating this for a case of two power supply units, providing output currents I1 and I2, respectively, in a 180° phase relationship with each other. It can easily be seen that, if the individual currents I1 and I2 have the same amplitude, and if the rate of increase dI/dt from the lower peak to the higher peak is equal to the rate of decrease dI/dt from the higher peak to the lower peak, the resulting current $I_{total}$ is substantially constant, having no ripple or only a very small ripple. Even when said individual currents do not have ideal match, typically a reduction of the ripple amplitude is achieved anyway.

Operating power supply units in a power supply assembly such that they operate in synchronization but with shifted phases is indicated as "interleaved" operation. Interleaved operation relevant to the field of application considered here has already been proposed in the publication "interleaved converters based on hysteresis current control" by J. S. Batchvarov et al, 2000, I.E.E.E. 31st Annual Power Electronics Specialists Conference, page 655. In this proposal, relating to an assembly of two converter units, one of the converter units has the status of master whereas the other converter unit has the status of slave. The proposed control circuitry of this proposal is rather complicated.

SUMMARY OF THE INVENTION

It is a general objective of the present invention to provide an improved power supply assembly.

Especially, it is an important objective of the present invention to provide a power supply assembly comprising two or more power supply units operating in an interleaved manner, having a relatively simple control circuitry.

It is a further special objective of the present invention to provide a power supply assembly comprising two or more power supply units in a modular design, such that it is easily possible to add one or more power supply units.

According to an important aspect of the present invention, the power supply units of the power supply assembly of the present invention have equal status: each power supply unit generates control signals for the next power supply unit in line, and receives control signals from the previous power supply unit in line. The last power supply unit generates control signals for the first power supply unit in line, so that the power supply units of the power supply assembly are arranged in a ring-configuration. The control signals are such that an interleaved operation is automatically assured.

BRIEF DESCRIPTION OF THE DRAWINGS

These and other aspects, features and advantages of the present invention will be further explained by the following description of a preferred embodiment of a power supply assembly according to the present invention with reference to the drawings, in which same reference numerals indicate same or similar parts, and in which.

In the following, the present invention will be explained in detail for the case of a converter assembly, unless specified specifically. However, it is to be noted that this explanation is not intended to restrict the present invention to converters only; it is specifically noted that same or similar principles also apply to inverters, as will be clear to persons skilled in the art.

Figure 1:
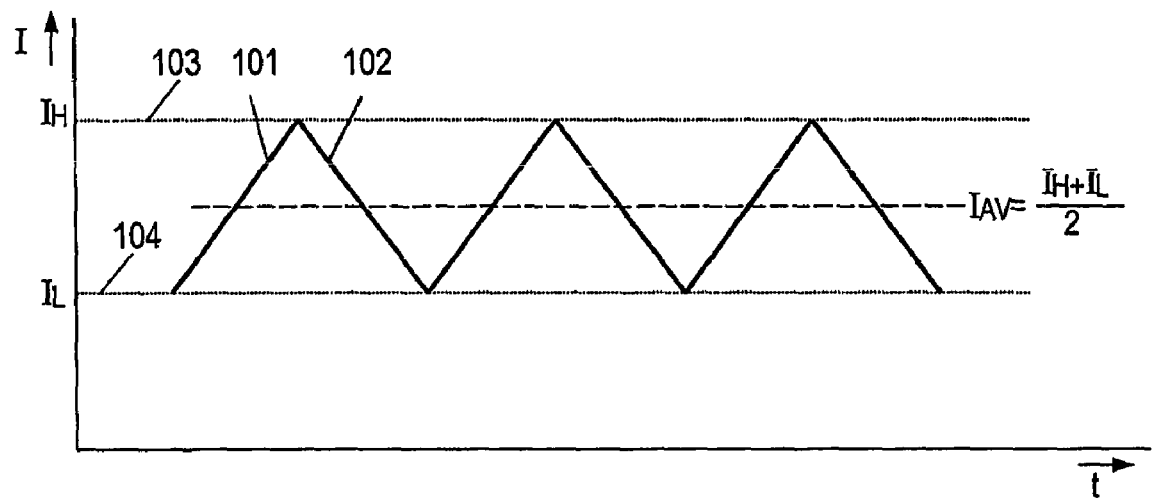
FIG. 1 is a time graph schematically illustrating that an AC signal on a small time scale may result in a constant signal on al larger time scale.
Figure 2:
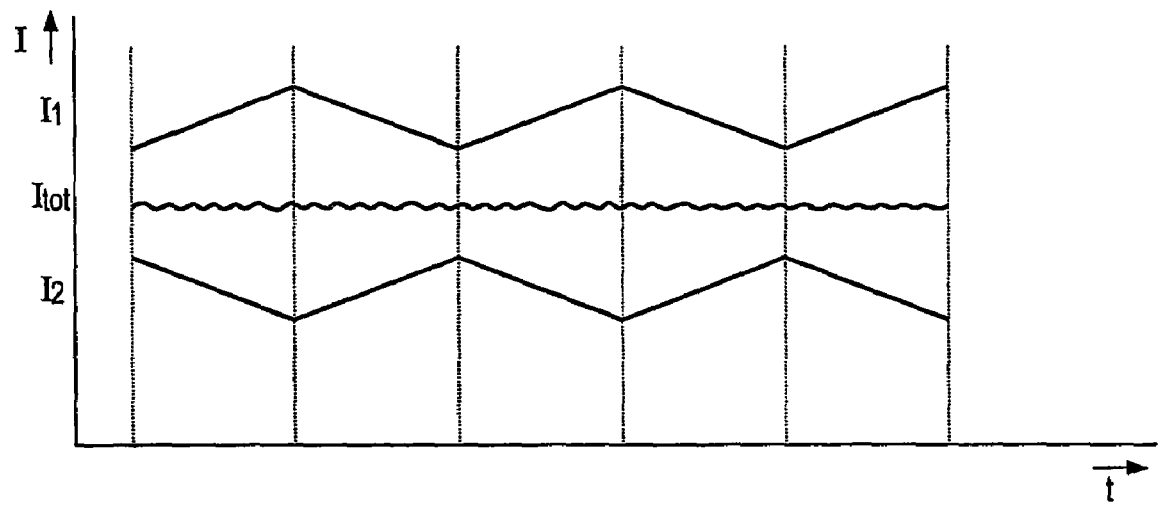
FIG. 2 is a time graph schematically illustrating that the ripple components of two signals added together may compensate each other.
Figure 3:
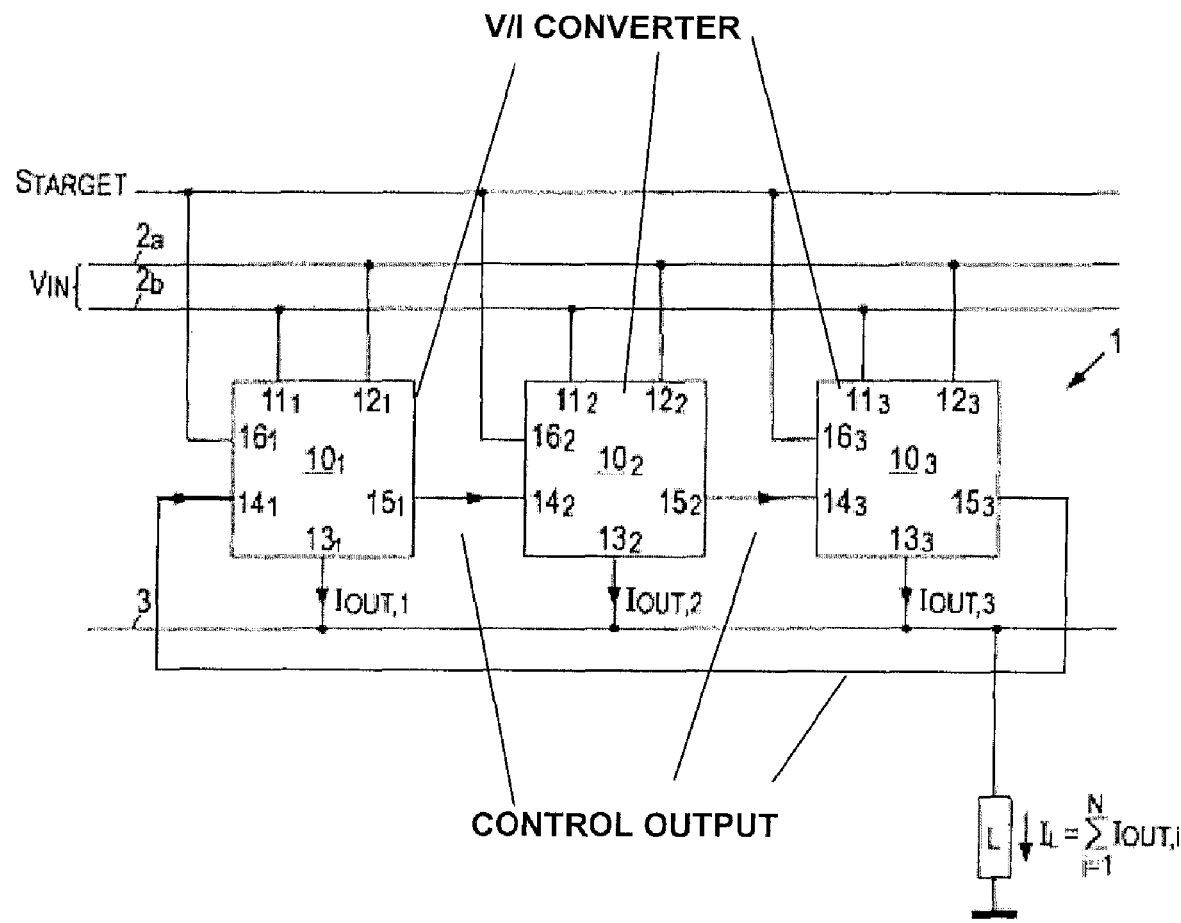
FIG. 3 is a block diagram schematically illustrating a power supply assembly.

FIG. 3 is a block diagram schematically showing part of a converter assembly 1 comprising a plurality of converter units 10. In the following, same components of the individual converter units will be indicated by the same reference numerals, distinguished by an index 1, 2, 3, etc. In FIG. 3, only three converter units 10₁, 10₂ and 10₃ are shown, but the assembly 1 can easily be extended by adding converter units. Further, the converter assembly 1 may comprise only two converter units, by taking one of the converter units away.

In the following explanation, it is assumed that the converter units 10 receive an input DC voltage $V_{IN}$ and generate an output current $I_{OUT}$. Each converter unit $10_i$ has two input terminals $11_i$ and $12_i$ connected to voltage supply lines $2a$ and $2b$, respectively, for receiving the input voltage $V_{IN}$, and an output terminal $13_i$ connected to an output line 3 for providing the output current $I_{OUT,i}$. Herein, i=1, 2, 3 . . . etc. The converter units 10 are connected in parallel, i.e. their respective first input terminals $11_i$ are all connected together to one voltage supply line $2a$, their respective second input terminals $12_i$ are all connected together to one voltage supply line $2b$, and their respective output terminals $13_i$ are all connected together to one output line 3, which is connected to a load L. The load current $I_L$ can be written as the following formula:

$$I_L = \sum_{i=1}^{N} I_{OUT,i}$$

wherein N is an integer indicating the total number of converter units 10, N being 3 in the example of FIG. 3.

According to an important aspect of the present invention, each control unit 10 has a control input 14 and a control output 15. Each control unit $10_i$ has its control input $14_i$ connected to the control output $15_{i-1}$ of its predecessor neighbour $10_{i-1}$, and has its control output $15_i$ connected to the control input $14_{i+1}$ of its following neighbour $10_{i+1}$. The control output $15_N$ of the last control unit $10_N$ is connected to the control input $14_1$ of the first control unit $10_1$. Thus, the control units 10 are arranged in a ring-configuration.

It will be seen that the modular design of the converter assembly 1 can easily be amended by taking one of the control units away. For instance, the control unit $10_2$ can be taken away, in which case the control output $15_1$ of the first control unit $10_1$ is connected to the control input $14_3$ of the third control unit $10_3$.

Also, the control assembly 1 can easily be extended by adding a further control unit $10_X$ (not shown in FIG. 3) between, for example, the second control unit $10_2$ and the third control unit $10_3$, in which case the connection between the second control output $15_2$ and the third control input $14_3$ is disconnected, the second control output $15_2$ is connected to control input $14_X$ of the added control unit $10_X$, and the control output $15_X$ of the added converter unit $10_X$ is connected to the third control input $14_3$.

Figure 4:
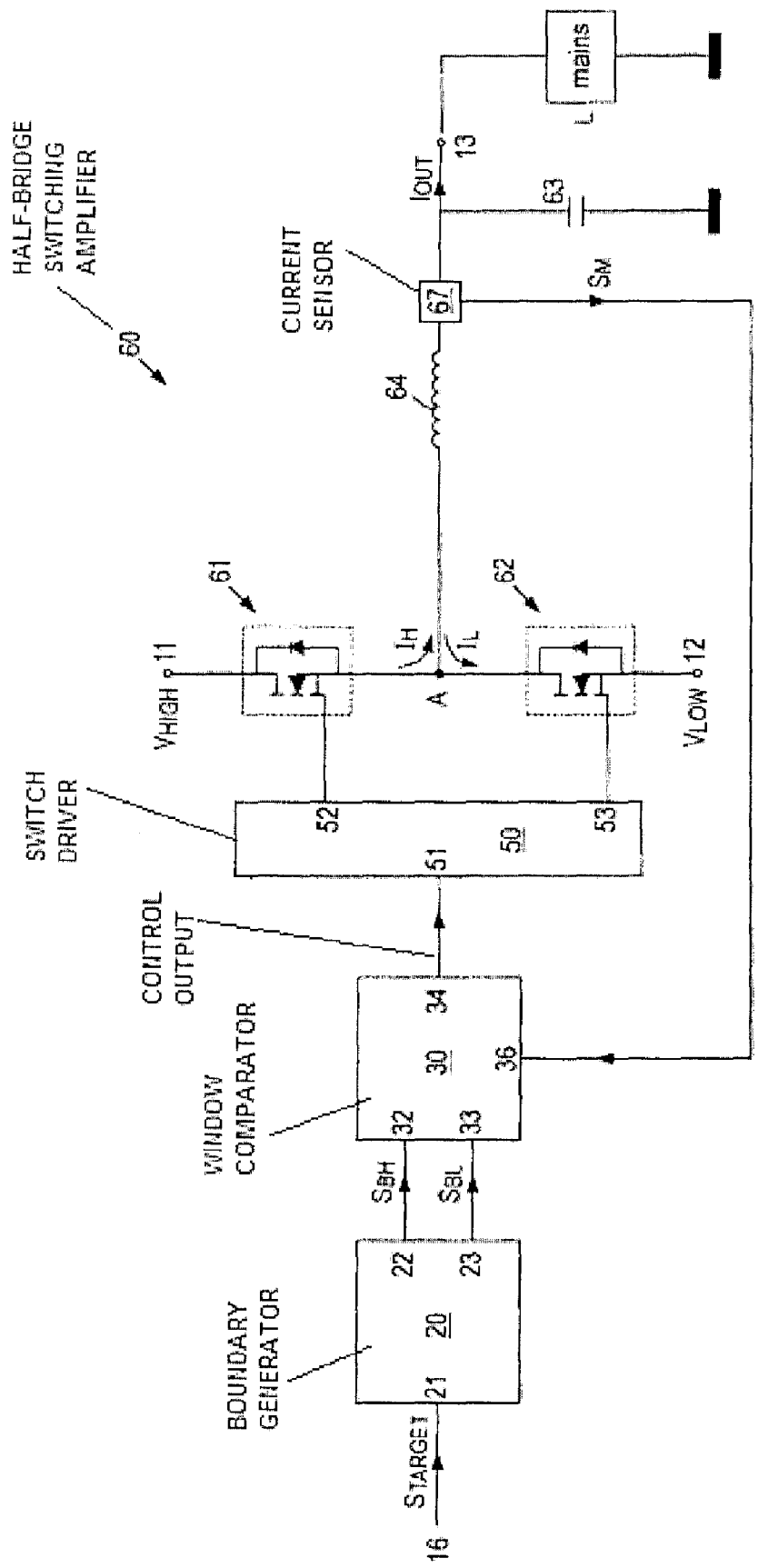
FIG. 4 is a block diagram schematically illustrating a power supply module.

The general design of converter units is known per se. A possible embodiment of a known converter unit, suitable to be used as basis for a converter unit of the present invention, will be described with reference to FIG. 4. The converter unit 10 of this example comprises a half-bridge switching amplifier 60, the heart of which is formed by a pair of controlled switches 61 and 62, usually implemented as a pair of MOSFETS, connected in series between on the one hand the first input terminal 11 for connection to a high supply voltage level $V_{HIGH}$ and on the other hand the second supply input terminal 12 for connection to a low supply voltage level $V_{LOW}$. The node A between these two controllable switches 61 and 62 connects to the output terminal 13 through a load inductor 64 connected in series. In FIG. 4, it is shown for this example that the load L connected to output terminal 13 can be a voltage source, for instance a chargeable battery or, as shown, standard mains. In such case, the voltage at output terminal 13 is constant, as determined by the mains. Typically, a filter capacitor 63 is connected in parallel to the output 13.

The controllable switches 61 and 62 have their control terminals connected to control outputs 52 and 53, respectively, of a gate driver 50. The gate driver 50 is designed to operate in two possible operative states.

In a first operative state, the gate driver 50 generates its control signals for the controllable switches 61 and 62 such that the first switch 61 is in its conductive state while the second switch 62 is in its non-conductive state.

In a second operative state, the gate driver 50 generates its control signals for the controllable switches 61 and 62 such that the second switch 62 is in its conductive state while the first switch 61 is in its non-conductive state.

Thus, in the first operative state, the node A is connected to the high supply voltage level $V_{HIGH}$, and a current $I_H$ is generated between first supply input terminal 11 and output terminal 13. Filtered by the inductor 64, and depending on the voltage level at the output terminal 13 in relation to the high supply voltage level $V_{HIGH}$, this typically leads to a rising output current $I_{OUT}$, indicated by lines $65a$ and $65b$ in FIG. 5. In the second operative state, the node A is connected to the low supply voltage $V_{LOW}$, and a current $I_L$ is generated between second supply input terminal 12 and output terminal 13. Filtered by the inductor 64, this typically leads to a decreasing output current $I_{OUT}$, indicated by the lines $66a$ and $66b$ in FIG. 5.

It is noted that in the setup shown in FIG. 4, the output current $I_{OUT}$ is capable of passing zero and change direction. It is also possible to operate the driver 50 such that the output current $I_{OUT}$ is always positive or negative, i.e. does not change direction. In that case, one of the switches may always be kept OFF, or may be replaced by a non-controllable switch, or may even be replaced by a diode. Referring to FIG. 4, assume that the current is positive (i.e. flowing from the first supply input terminal 11 to the output terminal 13), and that first switch 61 is in its conductive state while the second switch 62 is in its non-conductive state. Then, the current magnitude will increase (line 65b in FIG. 5). When the first switch 61 is now switched to its non-conductive state, while the second switch 62 remains in its non-conductive state, a positive current with decreasing magnitude flows from the second supply input terminal 12 to the output terminal 13 via the diode of switch 62. It will be clear that the same effect is achieved if the second switch 62 is replaced by a diode. It will also be clear that the same effect is achieved more efficiently if the second switch 62 is switched to its conductive state.

The output current $I_{OUT}$ is measured, for instance by an output current sensor 67, which generates a signal $S_M$ indicating the measured output current, which is provided to a measured signal input 36 of a window comparator 30.

The window comparator 30 has a first input 32 receiving a first boundary input signal $S_{BH}$, and a second input 33 receiving a second boundary input signal $S_{BL}$, wherein the first boundary level $S_{BH}$ is higher than the second boundary level $S_{BL}$. In the following, these two boundary levels will be indicated as high boundary level $S_{BH}$ and low boundary level $S_{BL}$, respectively.

The window comparator 30 compares the measured signal $S_M$ with the two boundary levels $S_{BH}$ and $S_{BL}$ received at its first and second input 32 and 33, respectively. It is noted that, in order for the window comparator 30 to be able to compare the measured output signal $S_M$ with the boundary levels $S_{BH}$ and $S_{BL}$, the measured output signal $S_M$ should have the same dimension as the boundary levels, i.e. they should all be current signals or voltage signals. Therefore, if for instance the boundary levels $S_{BH}$ and $S_{BL}$ are defined as signals in the voltage domain, the output sensor 67 should provide its output signal $S_M$ as a signal in the voltage domain, too.

Figure 5:
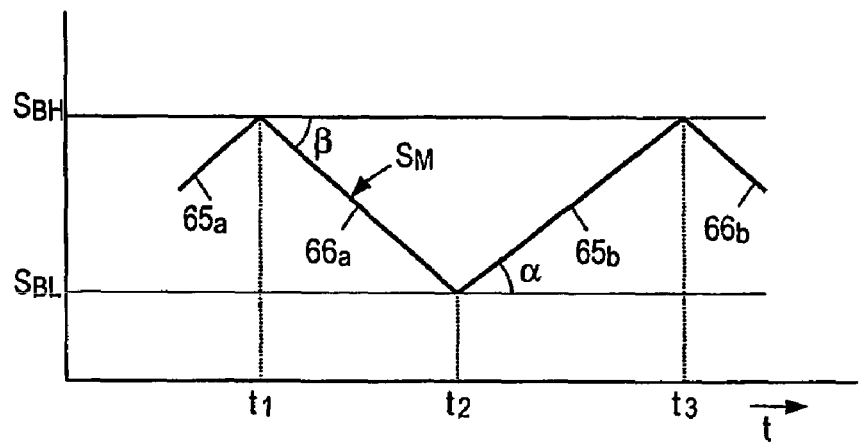
FIG. 5 is a time graph schematically illustrating the operation of a window comparator.

With reference to FIG. 5, the operation is as follows. Assume that the measured output current $I_{OUT}$ is within the window defined by the boundaries $S_{BH}$ and $S_{BL}$, and that the gate driver 50 is in the first operative state such that the output current $I_{OUT}$ is rising, as indicated by line 65a in FIG. 5. This situation continues, until at time t1 the measured output signal $S_M$ becomes equal to the high boundary level $S_{BH}$. At that moment, the window comparator 30 generates its output signal for the gate driver 50 such that the gate driver 50 switches to its second operative state. As a consequence, the output current $I_{OUT}$ decreases, as indicated by the line 66a in FIG. 5.

This situation continues, until at time t2 the lower boundary level $S_{BL}$ is reached. Now the window comparator 30 generates its output signal for the gate driver 50 such that the gate driver 50 again switches its operative state, i.e. enters the first operative state again, such that the output current $I_{OUT}$ is rising again, indicated by line 65b in FIG. 5. On a time scale larger than the period of the output current $I_{OUT}$, the output current $I_{OUT}$ has an average value $I_{OUT,AV}$ approximately corresponding to $0.5 \cdot (S_{BH}+S_{BL})$, although the exact value of $I_{OUT,AV}$ will depend on the nature of the load.

Figure 6A:
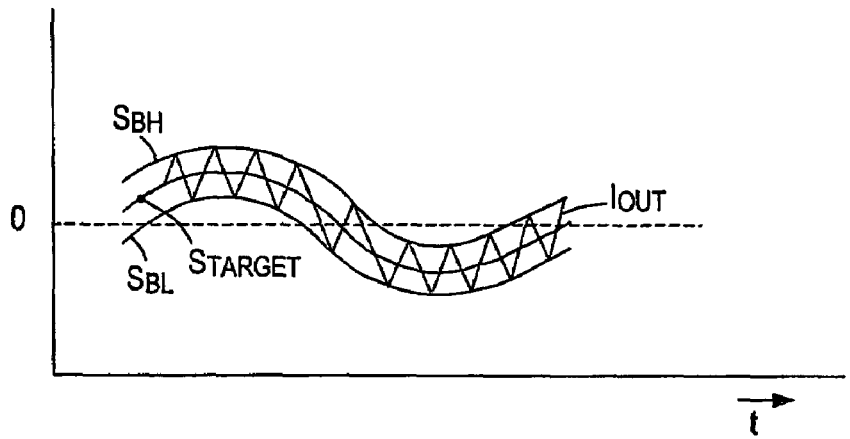
FIGS. 6A and 6B are time graphs schematically illustrating the operation of a boundary generator.

In a known converter unit, the window comparator 30 has its inputs 32 and 33 connected to outputs 22 and 23, respectively, of a boundary generator 20, which has an input 21 coupled to target input 16 of the converter unit 10. The boundary generator 20 is designed to generate the high boundary level signal $S_{BH}$ and the low boundary level signal $S_{BL}$ at its outputs 22 and 23, respectively, on the basis of the target signal $S_{TARGET}$ received at its input 21. This can be done in several ways. In a first exemplary embodiment, illustrated in FIG. 6A, the boundary generator 20 is adapted to generate its output signals according to the formulas $$S_{BH}=S_{TARGET}+S1; S_{BL}=S_{TARGET}-S2$$

wherein S1 and S2 are constant values which may be equal to each other. Thus, in this example, the window boundaries $S_{BH}$ and $S_{BL}$ follow the shape of the target signal $S_{TARGET}$, as illustrated in FIG. 6A. This figure also shows the resulting wave form of output current $I_{OUT}$. It will be seen that the average value $I_{OUT,AV}$ is substantially equal to the target signal $S_{TARGET}$.

Figure 6B:
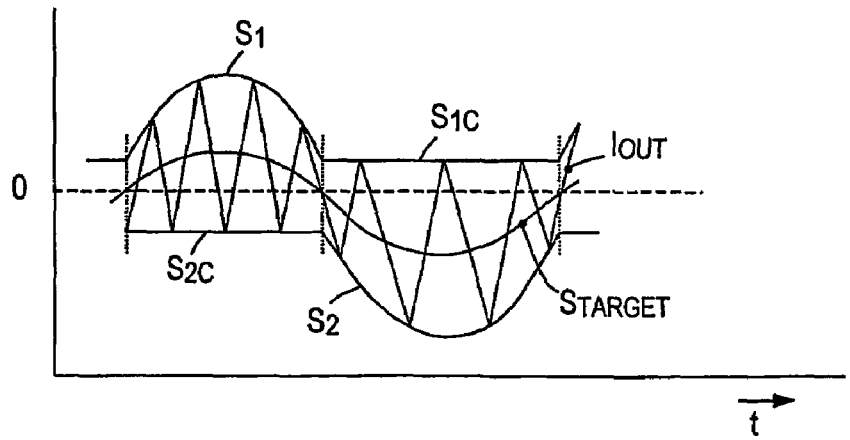

In another exemplary embodiment, illustrated in FIG. 6B, the boundary generator 20 assures that the high boundary level $S_{BH}$ is always positive and that the low boundary $S_{BL}$ is always negative. As long as the target signal $S_{TARGET}$ is above zero, the lower boundary level $S_{BL}$ has a constant value S2C below zero while the high boundary level S1 is chosen such that the average of S1 and S2C corresponds to the target signal $S_{TARGET}$. When the target signal $S_{TARGET}$ is negative, the opposite is true, i.e. the high boundary level $S_{BH}$ has a constant positive value S1C while the low boundary level $S_{BL}$ has a value S2 selected such that the average of S2 and S1C corresponds to the target signal $S_{TARGET}$. In this case, too, the average value $I_{OUT,AV}$ of the output current $I_{OUT}$ will substantially correspond to the target signal $S_{TARGET}$.

The above description describes the operation of an independent converter unit 10. As such, the description given above can be considered as prior art.

Figure 7:
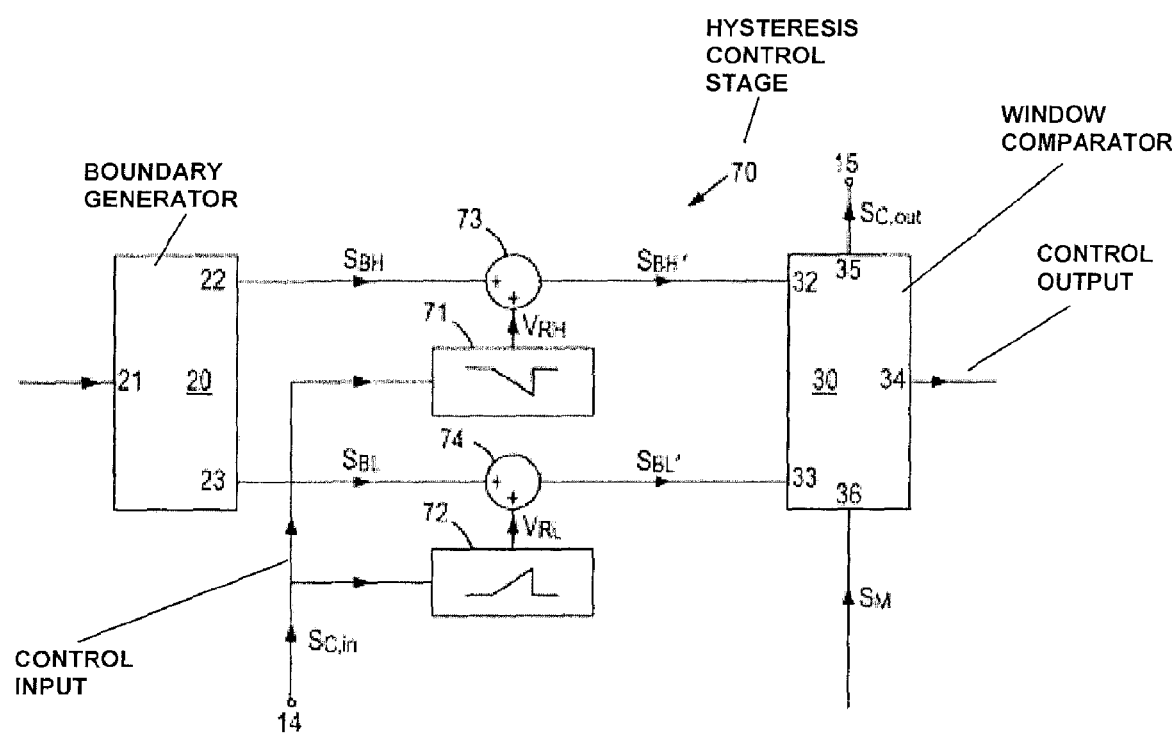
FIG. 7 is a block diagram schematically illustrating a detail of a power supply module in accordance with the present invention.

In order for the converter unit 10 to be able to be applied in a converter assembly 1 according to the invention, as illustrated in FIG. 3, the converter unit 10 has a control input 14, a control output 15, and a hysteresis control stage 70, as illustrated in the partial drawing of FIG. 7. The converter unit 10 is designed to generate at its control output 15 a synchronisation control output signal $S_{C,OUT}$ indicating the times t1, t2 when the measured output signal $S_M$ becomes equal to the high boundary level $S_{BH}$ or the low boundary level $S_{BL}$, respectively, or, more generally, indicating time-derivative of the measured output signal $S_M$ changes sign. In the embodiment illustrated in FIG. 7, the control output 15 is coupled to a control output 35 of the window comparator 30; however, the control output signal $S_{C,OUT}$ may also be derived from another source, for instance from the gate driver 50, or for instance from the current sensor 67.

The control output 15 may be a single output, and the control output signal $S_{C,OUT}$ may be a signal showing different values for indicating different events. For instance, the output signal $S_{C,OUT}$ may have a constant value at all times except t1 and t2, for instance a value zero, and may show a signal pulse having a first characteristic at time t1 and a signal pulse having its second characteristic at time t2. For instance, at time t1 the pulse may be positive whereas at time t2 the pulse may be negative, or vice versa. Alternatively, the pulses may have the same sign but different height. Alternatively, the pulses may have the same sign but different duration.

It is also possible that the control output 15 is actually constituted by two lines, one line carrying a signal indicating the times t1 and the other line carrying a signal indicating the times t2, in which case the control signals at both lines may be mutually identical because they are distinguished by being carried by different lines.

Likewise, the control input 14 may be a single input, or an input comprising two input lines, corresponding to the configuration of the control output 15, as will be clear to a person skilled in the art.

In the following description of an exemplary embodiment of the hysteresis control stage 70, it is assumed that the signals $S_{BH}$, $S_{BL}$ and $S_M$ are signals in the voltage domain. FIG. 7 illustrates that the hysteresis control stage 70 comprises a first ramp voltage generator 71 and a second ramp voltage generator 72. The hysteresis control stage 70 further comprises a first adder 73 and a second adder 74. The first adder 73 has one input coupled to the first output 22 of the boundary generator 20 for receiving the high boundary signal $S_{BH}$, has a second input coupled to an output of the first ramp voltage generator 71 for receiving a first ramp voltage $V_{RH}$, and has an output coupled to the first input 32 of the window comparator 30, providing a ramped high boundary signal $S'_{BH}$. Likewise, the second adder 74 has an input coupled to the second output 23 of the boundary generator 20 for receiving the low boundary signal $S_{BL}$, a second input coupled to an output of the second ramp voltage generator 72 for receiving a second ramp voltage $V_{RL}$, and an output coupled to the second input 33 of the window comparator 30, providing a ramped low boundary signal $S'_{BL}$. Thus, the ramped high boundary signal $S'_{BH}$ as received at the first input 32 of the window comparator 30 is the summation of the original high boundary level signal $S_{BH}$ as generated at the first output 22 of the boundary generator 20 and the first ramp voltage $V_{RH}$ outputted by the first ramp voltage generator 71, whereas the low boundary level $S'_{BL}$ as received at the second input 33 of the window comparator 30 is the summation of the original low boundary level signal $S_{BL}$ as generated at the second output 23 of the boundary generator 20 and the second ramp voltage $V_{RL}$ generated by the second ramp voltage generator 72.

Each ramp voltage generator is capable of generating a slowly increasing or decreasing output signal, starting when the ramp voltage generator receives a first command signal or trigger signal, and resetting when the ramp voltage generator receives a second command signal or reset signal. Thus, the resulting signal has a saw tooth shape, for which reason the ramp voltage generators may also be indicated as saw tooth generators.

Figure 8:
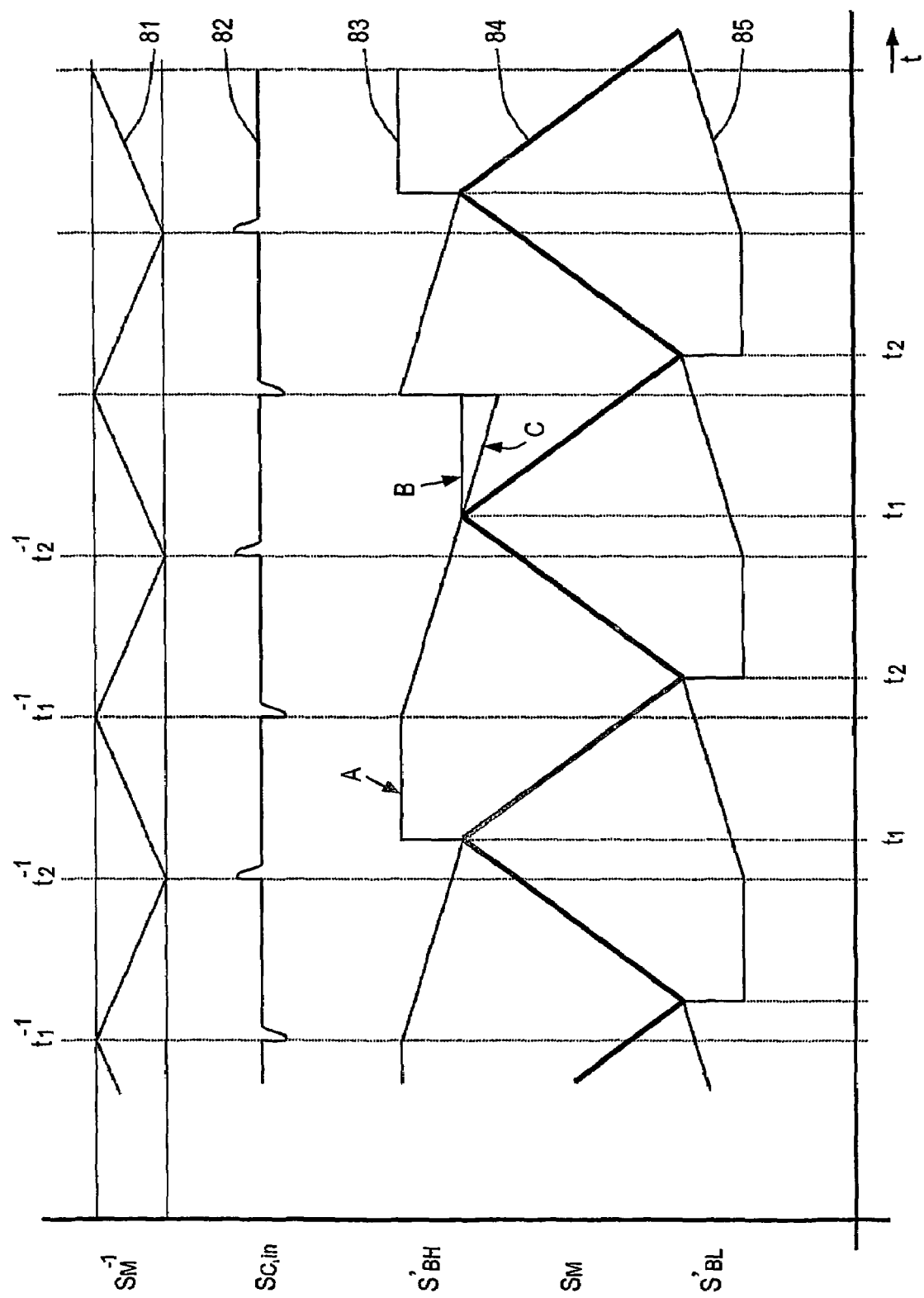
FIG. 8 is a time graph schematically illustrating the operation of the ramp voltage generators of a power supply module.

FIG. 8 illustrates the operation of the ramp voltage generators 71 and 72 in a particular converter unit (for instance $10_i$; see FIG. 3) as a function of time.

Curve 81 indicates the measured output signal of the previous converter unit (for instance $10_{i-1}$; see FIG. 3) in an assembly, indicated as $S_M^{-1}$. The times when this measured signal apparently meets the high boundary level of the previous converter unit and reverses from increasing to decreasing are indicated as $t_1^{-1}$, whereas the times when the measured output signal $S_M^{-1}$ of the previous stage meets the lower boundary level of the previous converter unit and reverses from decreasing to increasing are indicated as $t_2^{-1}$. It is noted that the high and low boundary levels of the previous converter unit are not shown in FIG. 8 for sake of simplicity.

Curve 82 indicates a possible control input signal $S_{C,IN}$ received from the previous converter unit at input 14, which is an output signal at output $15_{i-1}$ of the previous converter unit. In this example, the input control signal $S_{C,IN}$ has negative pulses indicating the first times $t_1^{-1}$ and has positive pulses at times $t_2^{-1}$.

Curve 83 illustrates the high boundary level signal $S'_{BH}$ as received by the window comparator 30 at its first input 32. Curve 83 indicates that this high boundary level $S'_{BH}$ is constant until time $t_1^{-1}$, when the first ramp voltage generator 71 is triggered and the high boundary level $S'_{BH}$ starts to decrease.

Curve 85 illustrates the lower boundary level $S'_{BL}$ as received at the second input 33 of window comparator 30. It can be seen that this low boundary level $S'_{BL}$ is constant until time $t_2^{-1}$, at which moment the second ramp voltage generator 72 is triggered and the low boundary level $S'_{BL}$ starts to rise.

Curve 84 illustrates the measured output signal $S_M$ as produced by the output current sensor 67 and received at the measured signal input 36 of the window comparator 30. It can be seen that the measured output signal $S_M$ is rising, until at time t1 the measured output signal $S_M$ becomes equal to the decreasing high boundary level $S'_{BH}$. At that moment, as explained earlier, the window comparator 30 sends a command signal to the gate driver 50, which changes its operative state, such that the slope of the output current $I_{OUT}$ reverses direction, i.e. the measured output signal $S_M$ starts to decrease.

At time t2, the decreasing output signal $S_M$ meets the rising lower boundary level $S'_{BL}$, at which time the window comparator 30 sends a second command signal to the gate driver 50, which again changes its operative state, such that the output signal $S_M$ starts to rise again.

At time t1, when the rising output signal $S_M$ meets the decreasing high boundary level $S'_{BH}$, the first ramp voltage generator 71 may be reset to zero until the next occurrence of a negative input control pulse $S_{C,IN}$, as indicated at A in curve 83. However, it is also possible that the ramp voltage generator 71 is stopped at time $t_2^{-1}$, and is reset by the start pulse of $S_{C,IN}$ at time $t_1^{-1}$, as indicated at B in curve 83. Alternatively, the ramp voltage generator 71 may continue at time t1, until it is reset by the trigger pulse of $S_{C,IN}$, as illustrated at C in curve 83. The same applies, mutatis mutandis, for the second ramp voltage generator 72, but this is not illustrated in FIG. 8.

The slopes of the ramp voltages $V_{RH}$ and $V_{RL}$ generated by the first and second ramp voltage generators 71, 72 may be equal to each other, but these slopes may also be different from each other.

The slope of the ramp voltage $V_{RH}$ generated by the first ramp voltage generator 71 may be constant. Preferably, however, this slope is proportional to the difference between the input voltage $V_{HIGH}$ and the output voltage at output terminal 13. The same applies to the second ramp voltage $V_{RL}$ generated by the second ramp voltage generator 72. To this end, the ramp voltage generators 71 and 72 may have inputs coupled to the supply input terminals 11, 12 and to the output terminal 13, but this is not shown in FIG. 7 for sake of simplicity.

Figure 9:
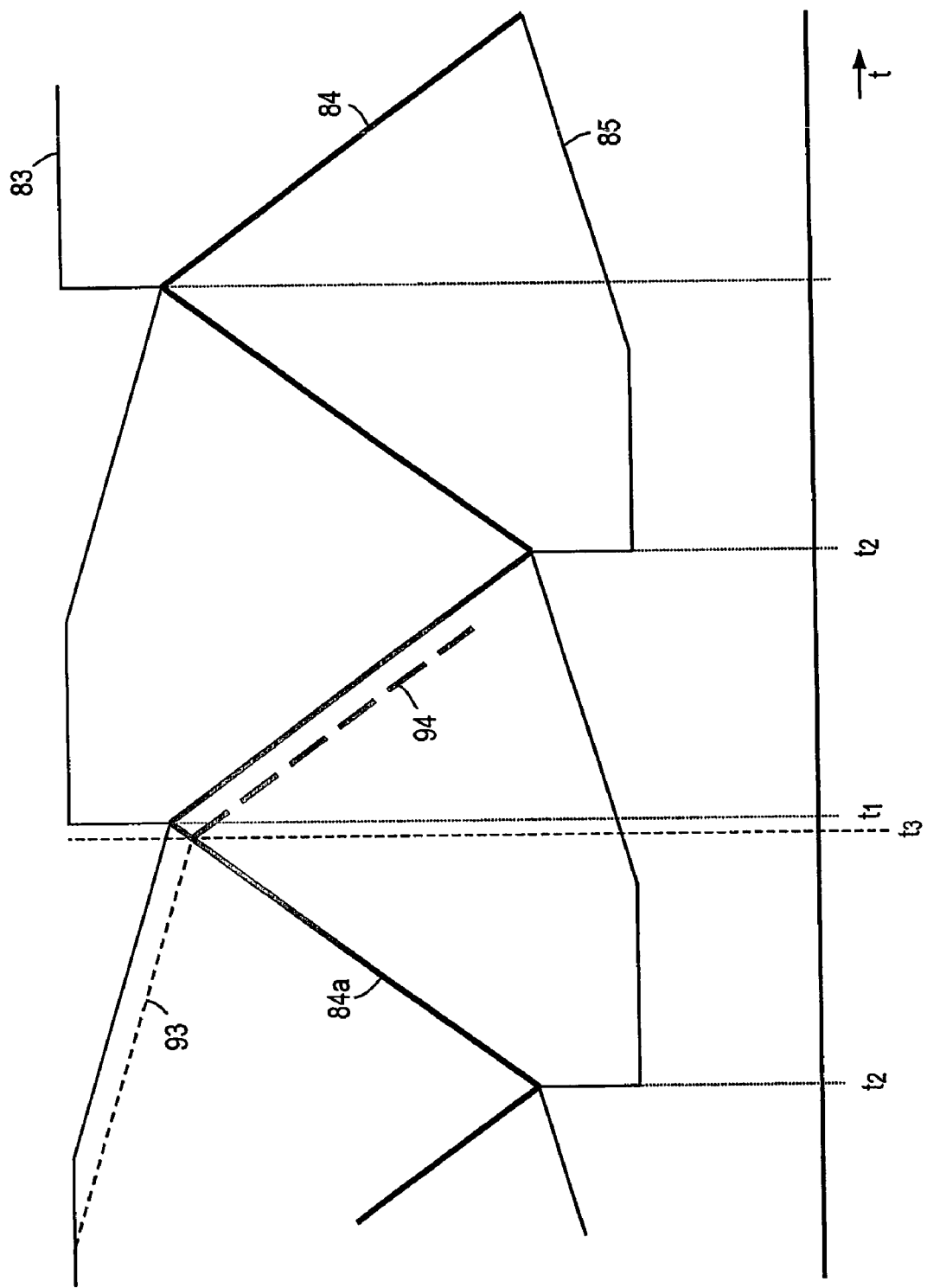
FIG. 9 is a time graph schematically illustrating part of the graph of FIG. 8 on a larger scale.

FIGS. 7 and 8 illustrate how the timing of the gate driver $50_i$ of a converter unit $10_i$ is controlled by control signals $S_{C,IN}$ from a previous converter unit $10_{i-1}$. In a steady state, two neighbouring converter units $10_i$ and $10_{i-1}$ will show a more or less fixed phase relationship, as can be explained by FIG. 9, which shows the signals $S_M$, $S'_{BH}$ and $S'_{BL}$ of FIG. 8 on a larger scale. In FIG. 9, solid line 84 illustrates the measured output signal $S_M$ for steady state, and solid line 83 illustrates the high boundary level $S'_{BH}$ for steady state. Assume that the previous control unit is somewhat ahead of the present converter unit, or that the present converter unit 10 is lagging somewhat with respect to the previous converter unit. Such situation is illustrated by the dashed line 93 in FIG. 9, which indicates that the first ramp voltage generator has been triggered earlier than the steady state case. Now, the rising output signal (line 84a) will meet the high boundary level $S'_{BH}$ at time t3, which is somewhat earlier than time t1 of the steady state case. Thus, the output signal will decrease earlier than in the steady state case (dashed line 94). It follows that momentarily the output signal has a somewhat lower amplitude and a somewhat higher frequency which reduces the lag with respect to the previous converter unit. The same applies, mutatis mutandis, when the previous converter unit is lagging with respect to the present converter unit.

With reference to FIGS. 7, 8 and 9, it has been explained how the timing of the gate driver 50 of one converter unit 10 is controlled by the previous converter unit. It has also been explained that the result will be a substantially fixed phase relationship between the output currents of those two converter units. This explanation applies to each pair of two neighbouring converter units in the converter assembly, but this is not shown in FIG. 8 for sake of simplicity. Thus, after a start-up phase, all converter units will have substantially fixed phase relationships to each other. It can be shown that, in the steady state case, assuming that all converter units in the converter assembly are substantially identical, the phase difference between two neighbouring converter units is substantially equal to 360°/N, N being the number of converter units in the converter assembly. The resulting overall output current of the converter assembly, being the summation of all individual output currents of the individual converter units, will have only very small ripple amplitude.

Figure 10:
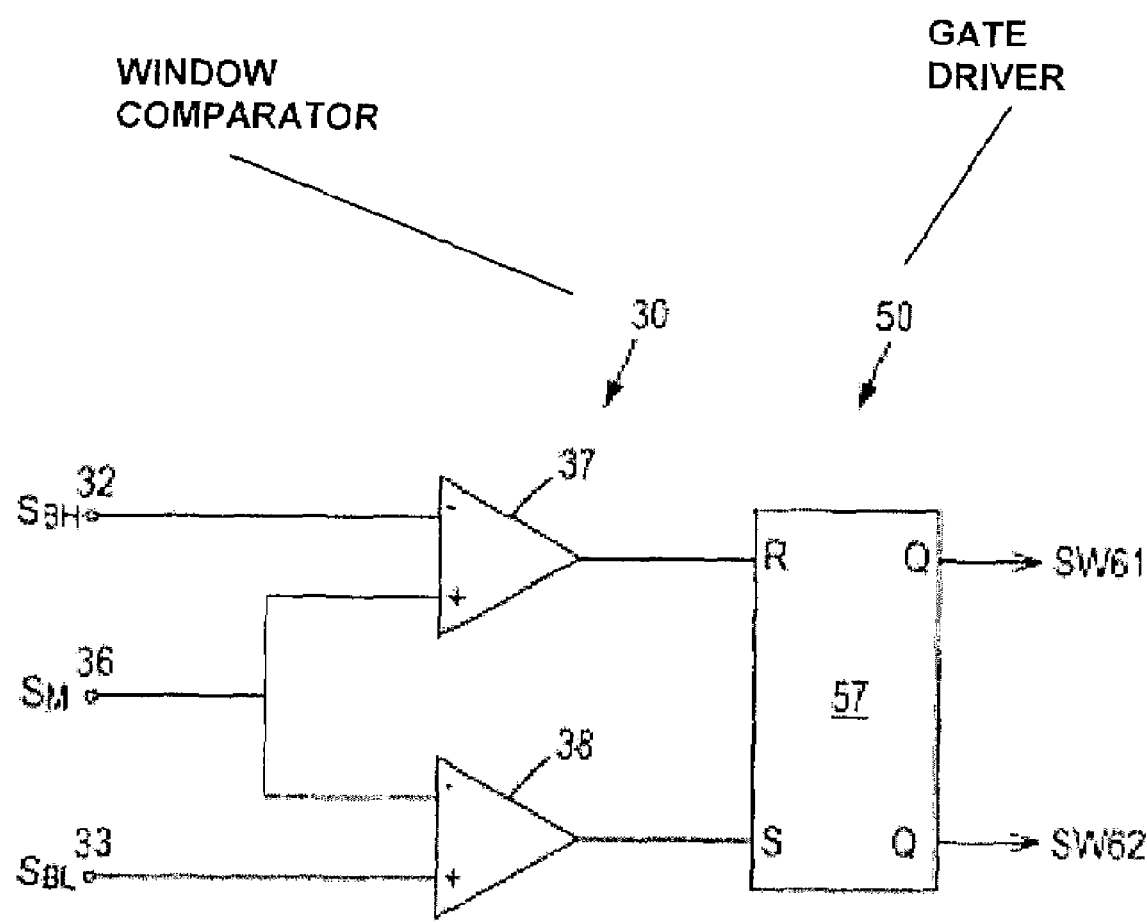
FIG. 10 is a block diagram schematically illustrating a possible embodiment of a window comparator and a gate driver.

FIG. 10 is a block diagram schematically illustrating a possible embodiment of a window comparator 30 and gate driver 50. In this embodiment, the window comparator 30 comprises a first voltage comparator 37 and a second voltage comparator 38, while the gate driver 50 comprises an RS flipflop 57. The first comparator 37 has an inverting input coupled to the first input 32 of the window comparator 30, has a non-inverting input coupled to the measured signal input 36 of the window comparator 30, and has an output coupled to the R-input of the RS flipflop 57. The second comparator 38 has a non-inverting input coupled to the second input 33 of the window comparator 30, has an inverting input coupled to the measured signal input 36 of the window comparator 30, and has an output coupled to the S-input of the RS flipflop 57. The Q-output of the RS flipflop 57 provides the drive signal for the first switch 61, while the $\overline{Q}$-output of the RS flipflop 57 provides the drive signal for the second switch 62.

It should be clear to a person skilled in the art that the present invention is not limited to the exemplary embodiments discussed above, but that several variations and modifications are possible within the protective scope of the invention as defined in the appending claims.

For instance, in the present preferred embodiment as discussed with reference to FIGS. 7 and 8, a ramp voltage is added to the high boundary level $S_{BH}$ as well as to the low boundary level $S_{BL}$. However, although this is preferred, in an alternative embodiment such ramp voltage is only applied to one of the boundary levels.

It is noted that, in the example of FIG. 7, the output voltage $V_{RH}$ of the first ramp voltage generator 71 has a negative slope, i.e. a slowly decreasing magnitude. Alternatively, the first ramp voltage generator 71 may provide a ramp voltage having a positive slope, like the second ramp voltage generator 72, in which case the first adder 73 should be replaced by a subtractor. Conversely, the second ramp voltage generator 72 may provide a ramp voltage having a negative slope, like the first ramp voltage generator 71, in which case the second adder 74 should be replaced by a subtractor.

Further, it is noted that the hysteresis control stage 70 may be integrated in the boundary generator 20 or the window comparator 30. Also, the boundary generator 20, the hysteresis control stage 70, the window comparator 30, and possibly the switch driver 50 may be integrated into one unit.

Further, the signals $S_{BH}$, $S_{BL}$ and $S_M$ may for instance be signals in the current domain; corresponding amendments to the design of the hysteresis control stage 70 will be clear to a person skilled in the art.

In the above, the present invention is explained for a converter having two controllable switches 61 and 62 connected in series. However, the present invention is not limited to devices having two controllable switches connected in series; it is sufficient if only one of said switches is controllable. For instance, with reference to FIG. 4, second switch 62 may be replaced by a (non-controllable) diode having its cathode directed to node A, or first switch 61 may be replaced by a (non-controllable) diode having its anode directed to node A (buck-type converter). Since converters of this type are known per se, while it will be clear to a person skilled in the art that the gist of the present invention also applies to converters of this type, it is not necessary here to discuss the operation of such converters in great detail. It is noted, however, that in such case the corresponding current is not hysteresis-controlled. For instance, in the case where second switch 62 is replaced by a (non-controllable) diode having its cathode directed to node A, hysteresis control is only executed on the rising current becoming equal to the high-boundary level, with a ramp voltage correction applied to the high-boundary level or to the measuring signal. A low boundary level for the dropping current is always zero. Detecting when the dropping current becomes equal to zero may be done in the manner described above, but can also be done in other ways in this special case. With reference to FIGS. 7 and 8, it should be clear that the ramp voltages are generated such as to reduce the difference between output current measurement signal $S_M$ and high boundary level $S_{BH}$ or low boundary level $S_{BL}$, respectively. In the embodiment discussed, this is implemented by reducing the high boundary level $S_{BH}$ and increasing the low boundary level $S_{BL}$, respectively. Reducing the high boundary level $S_{BH}$ is implemented by adding a negative ramp voltage $V_{RH}$ to the high boundary level $S_{BH}$; in an alternative which is considered equivalent, a positive ramp voltage may be subtracted from the high boundary level $S_{BH}$. Increasing the low boundary level $S_{BL}$ is implemented by adding a positive ramp voltage $V_{RL}$ to the low boundary level $S_{BL}$; in an alternative which is considered equivalent, a negative ramp voltage may be subtracted from the low boundary level $S_{BL}$.

In an alternative embodiment, said difference may be reduced by increasing the measurement signal $S_M$ when rising (curve 65 in FIG. 5) and decreasing the measurement signal $S_M$ when falling (curve 66 in FIG. 5). Increasing the measurement signal $S_M$ when rising may be implemented by subtracting the negative ramp voltage $V_{RH}$ or, equivalently, by adding a positive ramp voltage. Decreasing the measurement signal $S_M$ when falling may be implemented by subtracting the positive ramp voltage $V_{RL}$ or, equivalently, by adding a negative ramp voltage. Such implementation is especially useful in a case where it is not possible to amend the output signals of the boundary generator, e.g. in the (existing) case where a boundary generator and a window comparator are implemented as one integrated circuit. In this case, too, it is possible that hysteresis control is performed on one level only, i.e. only for rising current or for falling current.

In the above, the present invention has been explained for an implementation in a half-bridge configuration. However, it should be clear to a person skilled in the art that the present invention can also be implemented in a full-bridge configuration.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, etc.

The invention claimed is:

1. A switched mode power supply assembly comprising a plurality of at least two switched mode power supply modules coupled to each other in a ring-configuration;
   each power supply module comprising synchronization control means for generating a synchronization control signal for a next neighboring module and for receiving an incoming synchronization control signal from a previous neighboring module in order to ensure interleaved operation of all modules without any one power supply module determining a synchronization of the power supply assembly.

2. The switched mode power supply assembly according to claim 1, wherein all power supply modules are mutually identical.

3. The switched mode power supply assembly according to claim 1, wherein each power supply module comprises a target signal input, all target signal inputs of all power supply modules being connected in parallel to one common target signal source.

4. The switched mode power supply assembly according to claim 1, wherein each power supply module comprises a current output, all current outputs of all power supply modules being connected in parallel to one common assembly output.

5. The switched mode power supply assembly according to claim 1, wherein each power supply module comprises a first supply input and a second supply input, all first supply inputs of all power supply modules being connected in parallel to one common high voltage supply source, and all second supply inputs of all power supply modules being connected in parallel to one common low voltage supply source.

6. The switched mode power supply assembly according to claim 1, wherein each power supply module comprises a control input and a control output, all control inputs being coupled to a control output of a previous neighboring module, and all control outputs being coupled to a control input of a next neighboring module.

7. The switched mode power supply assembly according to claim 1, wherein each power supply module further comprises a current sensor for generating a measuring signal representing the output current at said module output;
   wherein each power supply module further comprises current generating means being capable of operating in a first operative state in which said current generating means generates an output current having positive derivative and being capable of operating in a second operative state in which said current generating means generates an output current having negative derivative;
   said current generating means being adapted to switch from its first operative state to its second operative state when a rising measuring signal becomes equal to a high boundary signal, and being adapted to switch from its second operative state to its first operative state when a falling measuring signal becomes equal to a low boundary signal;
   wherein each power supply module further comprises a hysteresis control stage.

8. The switched mode power supply assembly according to claim 7, wherein each power supply module comprises a boundary generator having an input coupled to a target signal input, adapted to generate a high boundary signal at a first boundary generator output and to generate a low boundary signal at a second boundary generator output on the basis of a target signal received at said input;
   wherein said hysteresis control stage is adapted to control a difference between a rising measuring signal and said high boundary signal and adapted to control a difference between a falling measuring signal and said low boundary signal.

9. The switched mode power supply assembly according to claim 8, wherein said hysteresis control stage has a first input coupled to the first boundary generator output and a second input coupled to the second boundary generator output of the boundary generator for receiving the high boundary signal and the low boundary signal, respectively, and having a first output for providing a hysteresis-controlled high boundary signal and a second output for providing a hysteresis-controlled low boundary signal, respectively.

10. The switched mode power supply assembly according to claim 9, wherein said hysteresis control stage comprises a first ramp voltage generator for generating a first ramp voltage having an increasing magnitude, and means for reducing the high boundary signal by the magnitude of said first ramp voltage.

11. The switched mode power supply assembly according to claim 9, wherein said hysteresis control stage comprises a second ramp voltage generator for generating a second ramp voltage having an increasing magnitude, and means for increasing the low boundary signal by the magnitude of said second ramp voltage.

12. The switched mode power supply assembly according to claim 7, wherein each power supply module comprises a control input and a control output, each control input being coupled to a control output of a previous neighboring module, and each control output being coupled to a control input of a next neighboring module;
   each power supply module further being adapted to generate at its power supply output a first control output signal for indicating the moment in time when said current generating means switches from its first operative state to its second operative state, and to generate a second control output signal for indicating the moment in time when said current generating means switches from its second operative state to its first operative state.

13. The switched mode power supply assembly according to claim 12, wherein the hysteresis control stage comprises a first adder having one input coupled to the first output of the boundary generator and having another input coupled to an output of a ramp voltage generator which is triggered by the first control input received at the control input of the corresponding power supply module, the first adder having its output coupled to the first output of the hysteresis control stage for providing the hysteresis-controlled high boundary signal.

14. The switched mode power supply assembly according to claim 12, wherein the hysteresis control stage comprises a second adder having one input coupled to the second output of the boundary generator and having another input coupled to an output of a ramp voltage generator which is triggered by the second control input received at the control input of the corresponding power supply module, the second adder having its output coupled to the second output of the hysteresis control stage for providing the hysteresis-controlled low boundary signal.

15. The switched mode power supply assembly according to claim 7, wherein said current generating means comprise:
   two controllable switches coupled in series between a first supply input and a second supply input, a node between said switches being coupled to said module output;
   a switch driver having outputs coupled to control inputs of respective switches, the switch driver being capable of operating in a first operative state in which it generates its control output signals such that the second switch is non-conductive while the first switch is in its conductive state, and being capable of operating in a second operative state in which it generates its control output signals such that the first switch is non-conductive while the second switch is in its conductive state;

a window comparator having a high boundary input and a low boundary input, a control output coupled to a control input of said switch driver, and a measuring signal input coupled to receive said measuring signal from said current sensor;

wherein the window comparator is adapted to generate a first control signal commanding said switch driver to enter its first operative state when said falling measuring signal becomes equal to the signal level at its low boundary input, and to generate a second control signal commanding said switch driver to enter its second operative state when said rising measuring signal becomes equal to the signal level at its high boundary input.

16. The switched mode power supply assembly according to claim 15, wherein said window comparator has its inputs coupled to the outputs of the hysteresis control stage.

17. The switched mode power supply assembly according to claim 7, wherein said current generating means comprise:

a controllable switch and a diode coupled in series between a first supply input and a second supply input, a node between said switch and said diode being coupled to said module output;

a switch driver having an output coupled to the control input of the switch, the switch driver being capable of operating in a first operative state in which it generates its control output signal such that the switch is in its conductive state, and capable of operating in a second operative state in which it generates its control output signal such that the switch is non-conductive;

a window comparator having at least one boundary input, a control output coupled to a control input of said switch driver, and a measuring signal input coupled to receive said measuring signal from said current sensor;

wherein the window comparator is adapted to generate a control signal for said switch driver when said measuring signal becomes equal to the signal level at its at least one boundary input.

18. Switched mode power supply assembly according to claim 1, wherein the power supply modules are implemented as DC/DC converter modules.

19. Switched mode power supply assembly according to claim 1, wherein the power supply modules are implemented as DC/AC inverter modules.

20. Solar cell assembly, comprising a boost converter for up-converting the output voltage of the solar cells, having its output voltage coupled to a DC/AC inverter, wherein either said boost converter or said inverter, or both, comprise a switched mode power supply assembly according to claim 1.

21. Driver for driving a lamp such as a gas discharge lamp, comprising a switched mode power supply assembly according to claim 1 as a DC/AC inverter for generating supply current for the lamp.

22. Actuator for a motion control apparatus, comprising a switched mode power supply assembly according to claim 1.

* * * * *